June 10, 1941.  J. W. THOMAS, SR  2,244,974
VALVE
Filed Feb. 9, 1939
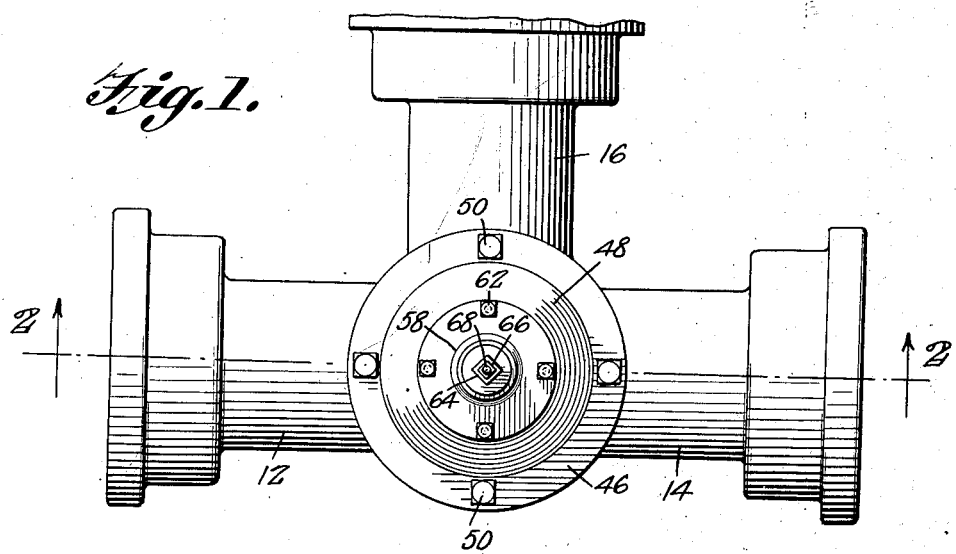
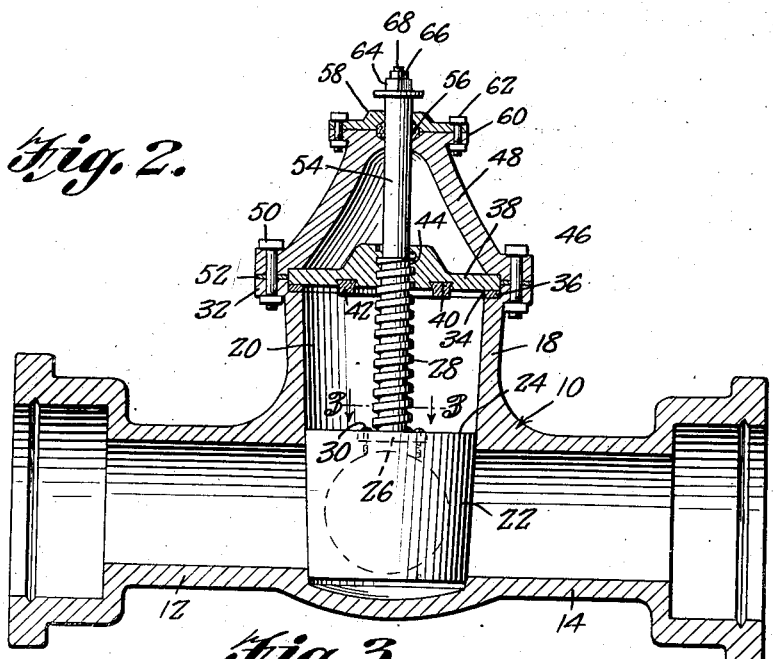
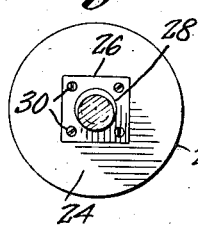
James W. Thomas, Sr.,
INVENTOR Patented June 10, 1941

2,244,974

UNITED STATES PATENT OFFICE 2,244,974

VALVE

James W. Thomas, Sr., Richmond, Mo.

Application February 9, 1939, Serial No. 255,527

1 Claim. (Cl. 251—49)

My invention relates to water mains and the like, and has among its objects and advantages the provision of an improved stop-valve.

In the accompanying drawing:

Figure 1 is a top plan view of a valve in accordance with my invention;

Figure 2 is a sectional view along the line 2—2 of Figure 1; and

Figure 3 is a sectional view along the line 3—3 of Figure 2.

In the embodiment selected to illustrate my invention, the valve body 10 includes branches 12, 14 and 16 adapted for connection with water mains. Branches 12 and 14 are axially aligned while branch 16 is right-angularly related thereto, so that the valve is adapted for connection with water mains arranged in intersecting relation. The valve body also includes an upstanding neck 18 including a bore 20 within which the stopper 22 is movable. Figure 2 illustrates the stopper 22 turned down for closing all the branches 12, 14 and 16.

The end face 24 of the stopper 22 is provided with a rectangularly shaped opening for the reception of the plate 26 fixedly related to the lower end of the stopper adjusting screw 28. Plate 26 is fixedly related to the stopper 22 by screws 30.

Neck 18 is flanged at 32 and is recessed at 34 for the reception of a lead washer 36 upon which I mount a lifting plate 38 grooved at 40 for anchoring a lead washer 42. Lifting plate 38 is provided with a threaded bore 44 in which the screw 28 operates for raising and lowering the stopper 22. Lifting plate 38 is fixedly related to the neck 18 by reason of the flange 46 associated with the cover 48 mounted above the plate. Flanges 32 and 46 are provided with aligned bores for the reception of bolts 50 through the medium of which the cover 48 is effectively clamped to the neck 18. A suitable gasket 52 is interposed between the flanges 32 and 46.

Screw 28 includes a shaft part 54 which extends through an opening in the top of the cover 48 and through a packing gland 56 defined by the upper end of the cover and a packing ring 58. Cover 48 is flanged at 60, and the flange and the packing ring 58 are provided with aligned openings for the reception of bolts 62 for securing the ring in place. To the outer end of the shaft 54 I connect a squared element 64 which is fixedly related to the shaft through the medium of a nut 66 having threaded relation with the reduced end 68. Element 68 constitutes a mount for a wrench to facilitate turning of the screw 28.

The valve is incorporated in water mains at intersections thereof and operates to eliminate extra valves, crossovers and T's in such conduits. My construction eliminates the necessity for a large number of valves which must be closed in cutting off the water in a given block. The valve is made up in combination of T's and crossovers so that by closing two valves the water in a given block will be shut off. In installations employing gate valves, it is necessary to close as many as five to eight valves to secure the same result, in addition to necessitating considerably more time for valve operating purposes.

Washer 36 constitutes an effective seal between the plate 38 and the neck 18, while the washer 42 has sealing relation with the face 24 of the stopper 22 when fully open so as to prevent leakage of water beyond the plate, thus affording protection for the packing gland 56.

Without further elaboration, the foregoing will so fully illustrate my invention that others may, by applying current knowledge, readily adapt the same for use under various conditions of service.

I claim:

In a water main installation, a valve including a body provided with branches for connection with intersecting water mains, a stopper operable in said body for closing all the mains, said body being provided with a bored neck for accommodating the stopper when moved to an open position, a plate extending across said neck and provided with a threaded opening, a bonnet extending over the plate and fixedly related to said neck for clamping the plate in position, said bonnet being provided with an opening aligned with said threaded opening, a screw fixedly connected with said stopper and having threaded relation with said threaded opening and provided with a shaft extending through the opening in said bonnet, sealing means carried by said plate and extending about the screw to be engaged by the stopper when moved to a full open position, a packing gland carried by the bonnet embracing said shaft, sealing means between said plate and the neck, and sealing means interposed between the bonnet and said neck.

JAMES W. THOMAS, Sr.